United States Patent
Saleh et al.

(10) Patent No.: US 6,632,033 B1
(45) Date of Patent: Oct. 14, 2003

(54) ULTRA-SHORT REACH OPTICAL COMMUNICATIONS SYSTEM AND METHOD OF MANUFACTURE

(75) Inventors: Ali Najib Saleh, Addison, TX (US); Matthew Lee Heston, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/291,223

(22) Filed: Apr. 13, 1999

(51) Int. Cl.[7] .............................................. H04B 10/00
(52) U.S. Cl. ...................................... 398/139; 398/200
(58) Field of Search ................................. 359/173, 154, 359/180, 188, 189, 195, 152; 455/41

(56) References Cited

U.S. PATENT DOCUMENTS

| | | | |
|---|---|---|---|
| 4,947,134 A | * | 8/1990 | Olsson ........................ 359/173 |
| 5,031,998 A | * | 7/1991 | Ono et al. .................... 359/124 |
| 5,140,452 A | * | 8/1992 | Yamamoto et al. .......... 359/154 |
| 5,191,627 A | * | 3/1993 | Haas et al. ................... 359/154 |
| 5,541,931 A | * | 7/1996 | Lee .............................. 359/135 |

* cited by examiner

Primary Examiner—Jason Chan
Assistant Examiner—Christina Y Leung
(74) Attorney, Agent, or Firm—Campbell Stephenson Ascolese LLP

(57) ABSTRACT

An ultra-short-reach optical transceiver is described. The ultra-short-reach optical transceiver comprises an optical transmitter, an optical receiver, and a clock and data recovery unit. The optical transmitter is configured to transmit a first signal. Additionally, the optical transmitter is nominally designed to transmit data at a designed transmit bit rate of between about 0.9 Gbps and about 1.25 Gbps. The first signal has a bit rate of between about 2 Gbps and about 3 Gbps, and exhibits an eye opening of at least about 50%. The optical receiver is configured to receive a second signal and is nominally designed to receive data at a designed receive bit rate of between about 0.9 Gbps and about 1.25 Gbps. The second signal has a bit rate of between about 2 Gbps and about 3 Gbps. The clock and data recovery unit is coupled to the optical receiver. The ultra-short-reach optical transceiver is configured to exchange data with another such ultra-short-reach optical transceiver over a fiber-optic cable of up to about 500 m in length, and at least about 50 m in length.

17 Claims, 9 Drawing Sheets

ULTRA-SHORT REACH OPTICAL COMMUNICATIONS SYSTEM AND METHOD OF MANUFACTURE

CROSS-REFERENCES TO RELATED APPLICATIONS

This application is related to Patent Application No. 09/232,395, filed Jan. 15, 1999 and entitled, "A CONFIGURABLE NETWORK ROUTER," having H. M. Zadikian, A. N. Seleh, J. C. Adler, Z. Baghdasarian, and V. Parsi as inventors; and Patent Application No. 09/232,397, filed Jan. 15, 1999 and entitled "A METHOD FOR ROUTING INFORMATION OVER A NETWORK," having A. N. Selah, H. M. Zadikian, Z. Baghdasarian, and V. Parsi as inventors. These related applications are assigned to Cisco Technology, Inc., the assignee of the present invention, and are hereby incorporated by reference in their entirety and for all purposes.

BACKGROUND OF THE INVENTION

1. Field of the Invention

This invention relates to the field of optical data communications, and more particularly relates to a method and apparatus for reliably operating optical transceivers at 2.5 Gbps that are designed to operate at 1.25 Gbps.

2. Description of the Related Art

The use of optical communications is becoming increasingly prevalent in a wide array of applications that require high bandwidth. For example, today's networks must carry vast amounts of information. High bandwidth applications supported by these networks include streaming video, streaming audio, and large aggregations of voice traffic. In the future, these bandwidth demands are certain to increase. To meet such demands, an increasingly popular alternative is the use of optical communications. The use of optical communications provides several benefits, including high bandwidth, low noise, ease of installation, and transparency for future growth.

Such optical communication systems transfer data at extremely high bit rates. To support these high bit rates, optical communications equipment often employs optical communications internally. The use of optical communications allows throughput to be more easily maintained, when compared to converting the incoming optical signals to electrical signals and subsequently distributing the electrical signals using copper cabling and/or printed-circuit boards. Thus, optical transceivers and cabling are often employed in transferring data from one section of the equipment to another, for example.

As transmission speeds have increased, however, the cost of optical transceivers has risen dramatically. Moreover, the cost/maturity curve for the higher-speed parts needed to meet these demands is flatter, indicating that the cost of such parts does not decrease as quickly with time as does that of lower-speed parts. Costs for such parts tends to be higher because yields, and so volume, is substantially lower in comparison to lower-performance parts. For example, the current cost of optical transceivers designed to operate at bit rates on the order of about 2.5 gigabits per second (Gbps) is approximately four to five times that of optical transceivers designed to operate at bit rates on the order of about 1 Gbps.

In light of the foregoing, it can be seen that providing high-speed optical communications at a relatively low cost is desirable.

SUMMARY

A method and apparatus are described for operating optical transceivers, designed to operate at about 1 Gbps, at about 2.5 Gbps. In doing so, an optical transceiver according to the present invention provides high-speed optical communications at a relatively low cost.

In one embodiment of the present invention, an ultra-short-reach optical transceiver is described. The ultra-short-reach optical transceiver comprises an optical transmitter, an optical receiver, and a clock and data recovery unit. The optical transmitter is configured to transmit a first signal. Additionally, the optical transmitter is nominally designed to transmit data at a designed transmit bit rate of between about 0.9 Gbps and about 1.25 Gbps. The first signal preferably has a bit rate of between about 2 Gbps and about 3 Gbps, and exhibits an eye opening of at least about 50%. More preferably, the first signal preferably has a bit rate of about 2.488 Gbps, and exhibits an eye opening of at least about 70%. The optical receiver is configured to receive a second signal and is nominally designed to receive data at a designed receive bit rate of between about 0.9 Gbps and about 1.25 Gbps, and, nominally, at a bit rate of about 1 Gbps. The second signal has a bit rate of between about 2 Gbps and about 3 Gbps and, preferably, a bit rate of about 2.488 Gbps. The clock and data recovery unit is coupled to the optical receiver. The ultra-short-reach optical transceiver is configured to exchange data with another such ultra-short-reach optical transceiver over a fiber-optic cable of up to about 500 m in length.

In another embodiment of the present invention, a method of manufacturing an ultra-short-reach optical transceiver is described. First, an optical transceiver design for an optical transceiver is created. The optical transceiver is nominally designed to transmit at a transmit bit rate of between about 0.9 Gbps and about 1.25 Gbps (preferably 1 Gbps), and to receive at a receive bit rate of between about 0.9 Gbps and about 1.25 Gbps (preferably 1 Gbps). This is done via the design itself, choice of fabrication process and materials, and other manufacturing parameters within the designer's control. Next, at least one optical transceiver is manufactured according to the optical transceiver design. A selected optical transceiver is then selecting from at least one optical transceivers manufactured. The selected optical transceiver is then tested, to determine if the selected optical transceiver is acceptable. This is accomplished by coupling the selected optical transceiver to an optical communications test unit with a fiber-optic cable and operating the selected optical transceiver at a transmit bit rate and a receive bit rate of between about 2 Gbps and about 3 Gbps, and, preferably, 2.488 Gbps. The fiber-optic cable is preferably up to about 500 m in length.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
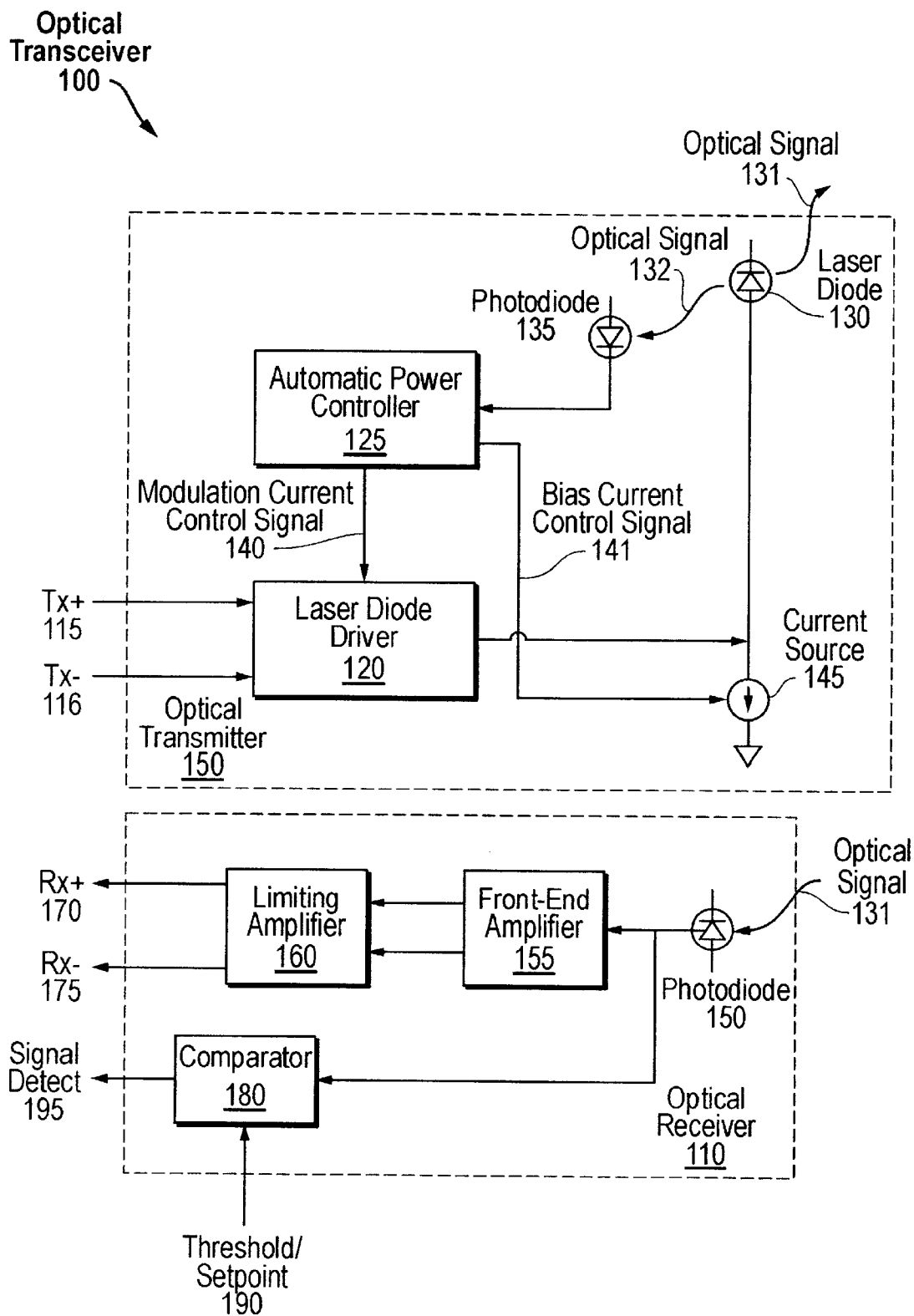
FIG. 1 is a block diagram of an exemplary ultra-short-reach optical transceiver.

FIG. 1 illustrates one embodiment of an ultra-short-reach optical transceiver 100. Ultra-short reach optical transceiver 100 includes an optical transmitter 105 and an optical receiver 110, among other possible elements. Optical transmitter 105 receives an input signal (exemplified by a differential input signal having a positive input 115 and negative input 116). The differential input signal is fed into a laser diode driver 120, which is controlled by an automatic power controller 125. Laser diode driver 120 drives a laser diode 130 to transmit data received at the differential inputs of laser diode driver 120. The optical signal from laser diode 130 (exemplified here by an optical signal 131) carries the data over an optical fiber (not shown) to an optical receiver (not shown). The optical output of laser diode 130 is also monitored (via an optical signal 132) by a photodiode 135 connected to automatic power controller 125. Automatic power controller 125 uses the signal generated by photodiode 135 to generate a modulation current control signal 140. Modulation current control signal 140 is supplied to laser diode driver 120 to control modulation current applied to laser diode 130 by laser diode driver 120. Automatic power controller 125 also generates a bias current control signal 141 which is supplied to a current source 145 to ensure that laser diode 130 operates in an acceptable current range. Automatic power controller 125 maintains a constant output of power throughout the entire temperature range in which ultra-short reach optical transceiver 100 is designed, or is capable of operating. Preferably, ultra-short reach optical transceiver 100 is designed to operate between about 0° C. and 70° C. More preferably, ultra-short reach optical transceiver 100 is capable of operating between about –5° C. and 85° C.

On the receive side of ultra-short-reach optical transceiver 100, optical receiver 110 includes a photo diode 150 which receives an optical signal 151 and converts it into an electrical signal that is provided to a front-end amplifier 155. Front-end amplifier 155 is, for example, a transconductance amplifier that converts this small current signal into a small voltage signal. Front-end amplifier 155 provides the small voltage signal as a differential signal to a limiting amplifier 160, which amplifies the signal further, generating a relatively large voltage signal and, optionally, performing waveform shaping. Limiting amplifier 160 provides the amplified signal as an output signal (preferably a differential output signal, as exemplified by a positive receive signal 170 and a negative receive signal 175). Front-end amplifier 155 also provides the small voltage signal to a comparator 100, which compares the amplified received signal to a threshold 190 and generates a signal detect 195. Signal detect 195 indicates the presence of an acceptable signal level at the input to optical receiver 110 (i.e., the fact that optical signal 151 is present an acceptable level), the acceptable signal level being set by the value of threshold 190. This level may depend on, for example, the distance over which optical signal 151 travels, the eye opening that is acceptable, and other such parameters.

Figure 3:
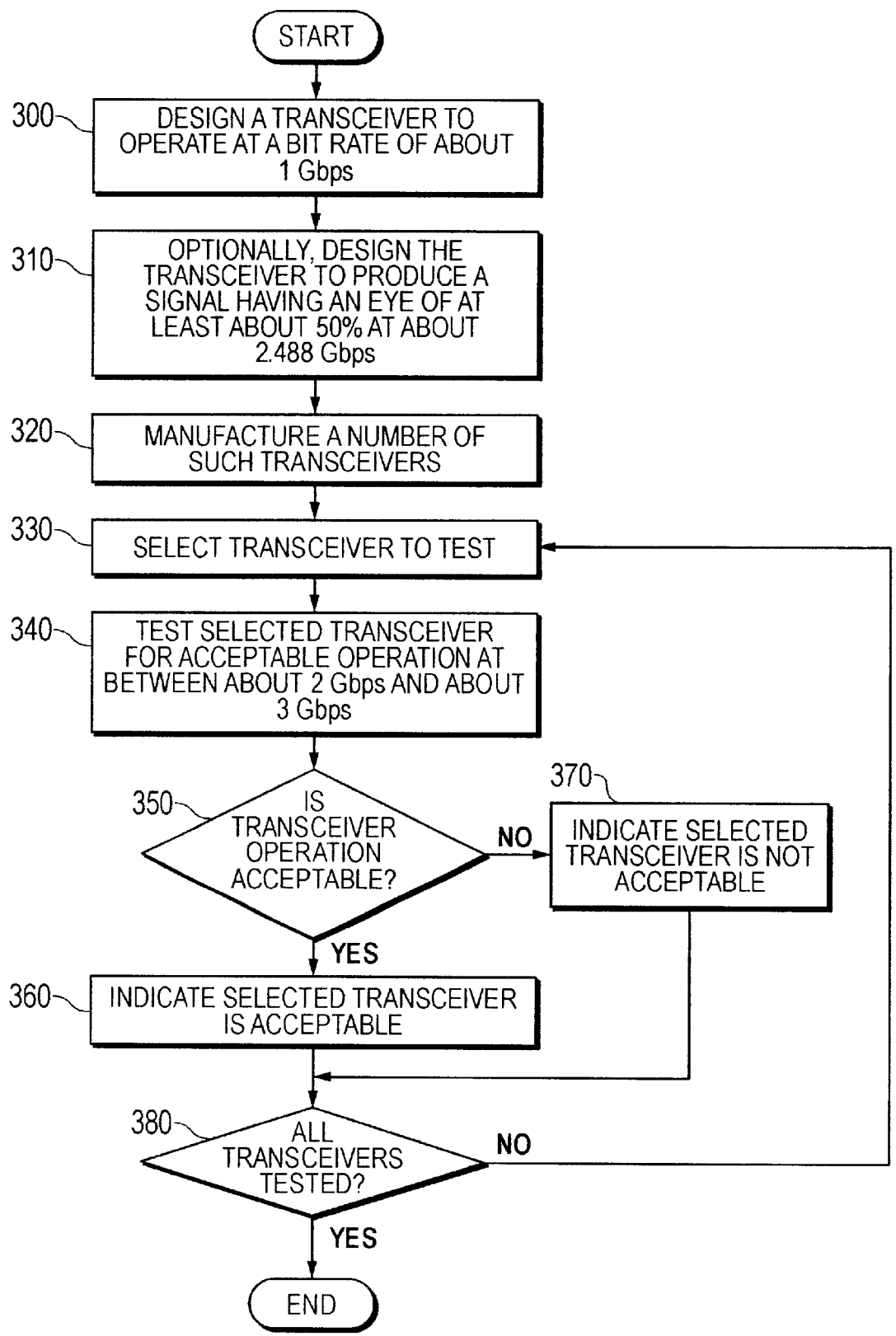
FIG. 3 is a block diagram of an exemplary method of manufacturing an ultra-short-reach optical transceiver.

Ultra-short-reach optical transceiver 100, as will be discussed with regard to FIG. 3, is preferably designed for operation at bit rates between about 0.9 Gbps and about 1.25 Gbps, and more preferably, for operation at about 1 Gbps. Ultra-short-reach optical transceiver 100 is, according to one embodiment, preferably operated at a bit rate of between about 2 Gbps and about 3 Gbps, and, more preferably, at a bit rate of about 2.488 Gbps. Ultra-short-reach optical transceiver 100 should be capable of operating over a distance of at least about 50 m, as this is often a minimum distance for inter-system communications in large telecommunications nodes. More preferably, ultra-short-reach optical transceiver 100 should be capable of operating over a distance of at least about 100 m, as this allows for a larger (more expansive) node and avoids the need for more expensive transceivers in a wider array of applications, especially in larger systems. For these reasons, the ability to support distances of up to about 500 m is most preferable. Optical transmitter 105 preferably provides an output signal that exhibits an eye opening of at least about 50% and, more preferably, one that exhibits an eye opening of at least about 70%, when measured at a bit rate of about 2.488 Gbps.

The inventors found these criteria to be interdependent. The inventors discovered that by carefully screening optical transceivers for acceptable operating characteristics and operating the transceivers (designed to operate over a given distance (e.g., 2000 m) at a given bit rate (e.g., 1 Gbps)), over a shorter distance (e.g., 500 m), successful operation of the transceivers at a higher bit rate (e.g., 2.488 Gbps) could be achieved. The eye opening exhibited by the received signal was found to be affected by operating distance and bit rate, which again required careful screening of transceivers to ensure reliable operation at the higher speeds required.

Regarding the signals described herein, those skilled in the art will recognize that a signal may be directly transmitted from a first block to a second block, or a signal may be modified (e.g., amplified, attenuated, delayed, latched, buffered, inverted, filtered or otherwise converted, etc.) between the blocks. Although the signals of the above described embodiment are characterized as transmitted from one block to the next, other embodiments of the invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Furthermore, those skilled in the art will recognize that boundaries between the functionality of the above described operations merely illustrative. The functionality of multiple operations may be combined into a single operation, and/or the functionality of a single operations may be distributed in additional operations in accordance with the invention. Moreover, alternative embodiments may include multiple instances of a particular component.

The foregoing described embodiments wherein the different components are contained within different other components (e.g., the transmitter and receiver contained within the transceiver) are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

Figure 2:
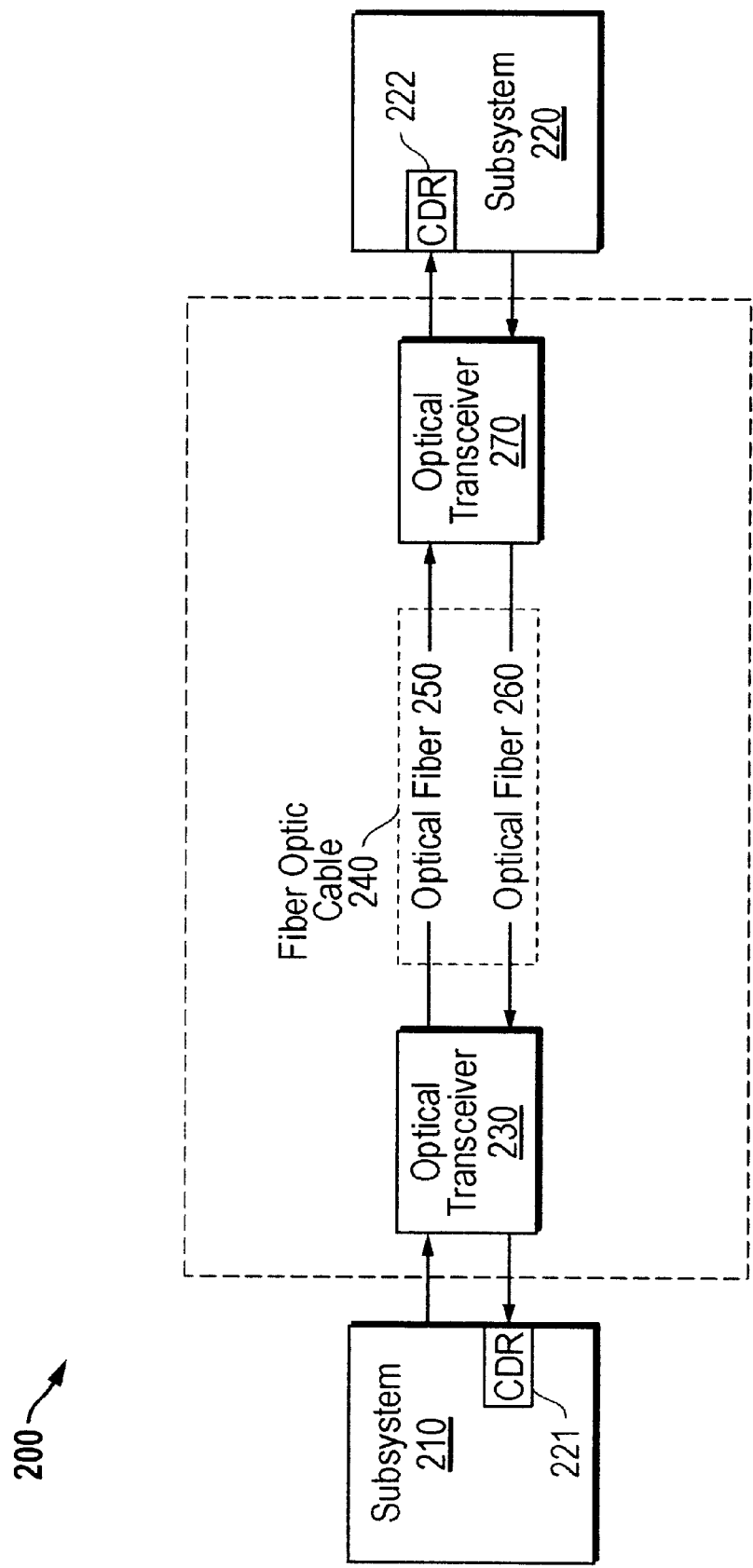
FIG. 2 is a block diagram of an exemplary ultra-short-reach optical communications system.

FIG. 2 illustrates an ultra-short-reach optical communications system 200. Ultra-short-reach optical communications system 200 is used in the configuration depicted in FIG. 2 to provide communications between sub-systems 210 and 220 at bit rate of between about 2 Gbps and about 3 Gbps, which each include a clock/data recovery CDR unit (exemplified by CDR units 221 and 222). CDR units 221 and 222 recover clocking information from the received signal, and in turn support the recovery of transmitted data from the incoming data stream. Preferably, optical communications system 200 operates at a bit rate of 2.488 Gbps. Data being transferred from sub-system 210 to sub-system 220 is provided, for example, as a differential signal from sub-system 210 to an optical transceiver 230, which is an optical transceiver such as that depicted in FIG. 1 as ultra-short-reach optical transceiver 100. Optical transceiver 230 transmits information via a fiber-optic cable 240, which includes optical fibers 250 and 260. Although fiber-optic cable 240 is depicted as having two fibers, fiber-optic cable 240 could use a single fiber, and may also include numerous other fibers, depending on the specific configuration. Optical transceiver 230 transmits information over optical fiber 250 to a receiver section (not shown) of an optical transceiver 270, which in turn coverts the transmitted optical signal into an electrical signal and provides that signal to sub-system 220. As before, optical transceiver 270 is an optical transceiver such as that depicted in FIG. 1 as ultra-short reach optical transceiver 100. In a similar fashion, sub-system 220 transmits data via optical transceiver 270 over optical fiber 260 to optical transceiver 230, which in turn converts the optical signal into an electrical signal which is provided to sub-system 210, for example, as a differential signal.

FIG. 3 depicts a flow diagram of the operations included in an exemplary method for manufacturing an ultra-short-reach optical transceiver such as optical transceiver 100. The functionality of steps referred to herein may correspond to the functionality of operations or portions of operations. Additionally, those skilled in the art will recognize that the boundaries between the operations depicted are merely illustrative and alternative embodiments may merge operations or impose an alternative decomposition of functionality of operations. For example, the operations discussed herein may be decomposed into sub-operations. Moreover, alternative embodiments may combine multiple instances of a particular operation or sub-operations. Furthermore, those skilled in the art will recognize that the operations described in exemplary embodiment are for illustration only. Operations may be combined or the functionality of the operations may be distributed in additional operations in accordance with the invention.

The design process depicted in FIG. 3 begins with the design of an optical transceiver (step 300). The transceiver is designed to operate at a bit rate of between about 0.9 Gbps and 1.25 Gbps, and preferably at a bit rate of about 1 Gbps. Optionally, the transceiver can also be designed to produce a signal having an eye opening of at least about 50% at about 2.488 Gbps, and preferably, to exhibit an eye opening of at least about 70% at that bit rate (step 310), although this characteristic is preferably screened for in any case.

Next, a number of optical transceivers are manufactured to the specified design in steps 300 and 310. A selection process is then initiated at step 330, where one of the manufactured transceivers is selected for testing. At step 340, the selected transceiver is tested for acceptable operation at between about 2 Gbps and about 3 Gbps. The test can be conducted over a distance of about 50 m, for example. Alternatively, the selected transceiver can be tested more rigorously, preferably by testing over distances of at least about 100 m, and most preferably by testing over distances of up to about 500 m. The configuration used to test the selected transceiver is shown in FIGS. 4A and 5A and is described subsequently.

It is then determined whether or not the selected transceiver's operation is acceptable (step 350). This is accomplished by analyzing the signals output by the transceiver's transmitter to ensure that the output power, eye opening, signal-to-noise ratio, and other characteristics are acceptable. Preferably, the transmitter provides output power on the order of about −9 dB. More preferably, the transmitter provides output power on the order of about −8 dB, and most preferably, on the order of about 4 dB. Also preferably, the transmitted signal exhibits an eye opening of at least about 50%, and, more preferably, at least about 70%. Optionally, the operation of the transceiver's receiver. If the operation of the selected transceiver is acceptable (step 360), the selected transceiver meets the specified operating requirements and the selected transceiver is marked as such, or some other indication made as to its acceptance. If the selected transceiver's operation is not acceptable (step 370), the selected transceiver's failure is noted, by marking the selected part or in some other manner. This process of selection and testing is carried out for a number of such transceivers, until all the transceivers to be tested have been examined (step 380).

Figure 4A:
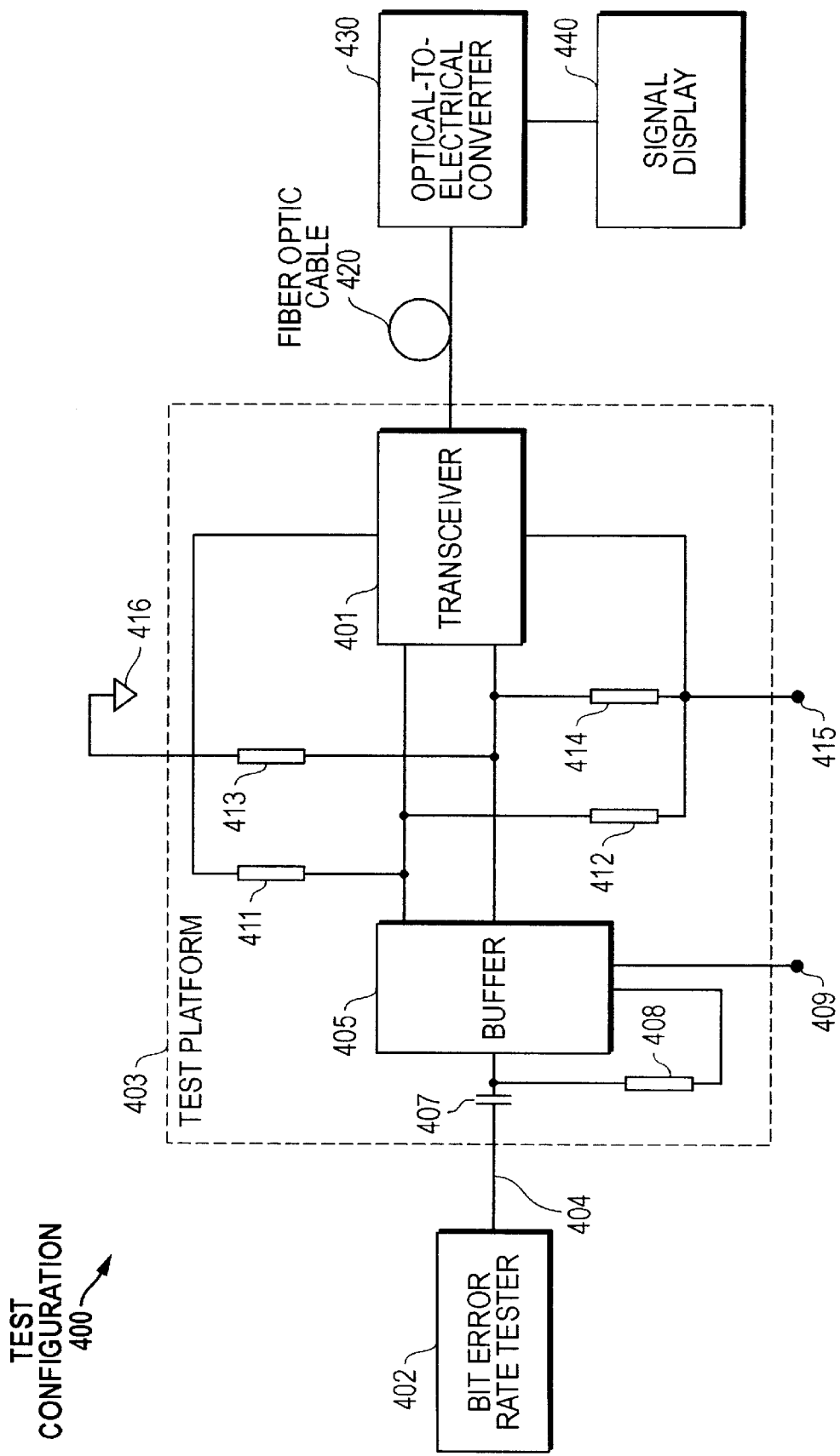
FIG. 4A is a block diagram of an exemplary test configuration for testing the transmitter of an ultra-short-reach optical transceiver.
Figure 5A:
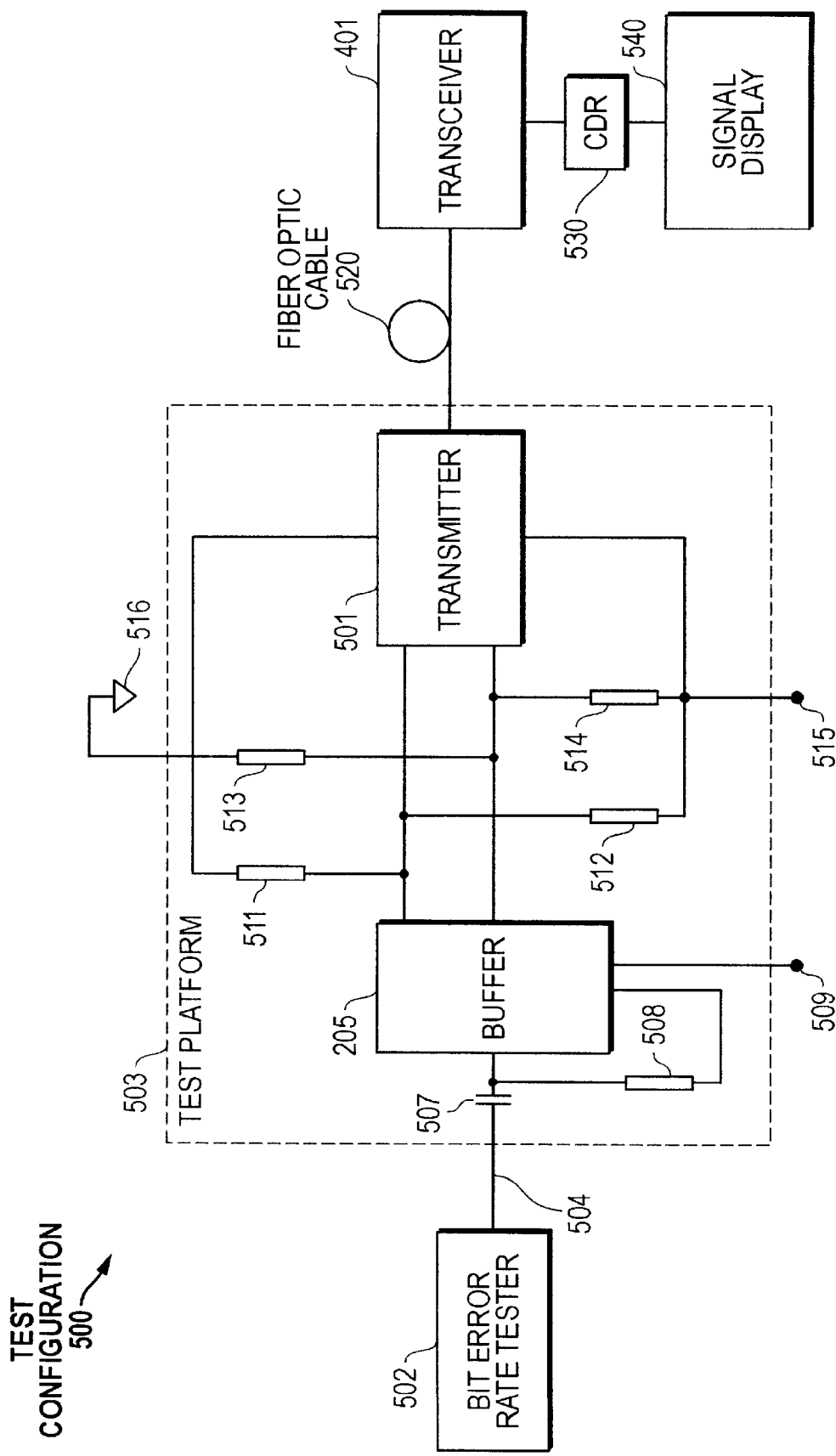
FIG. 5A is a block diagram of an exemplary test configuration for testing the receiver of an ultra-short-reach optical transceiver.
Figure 5B:
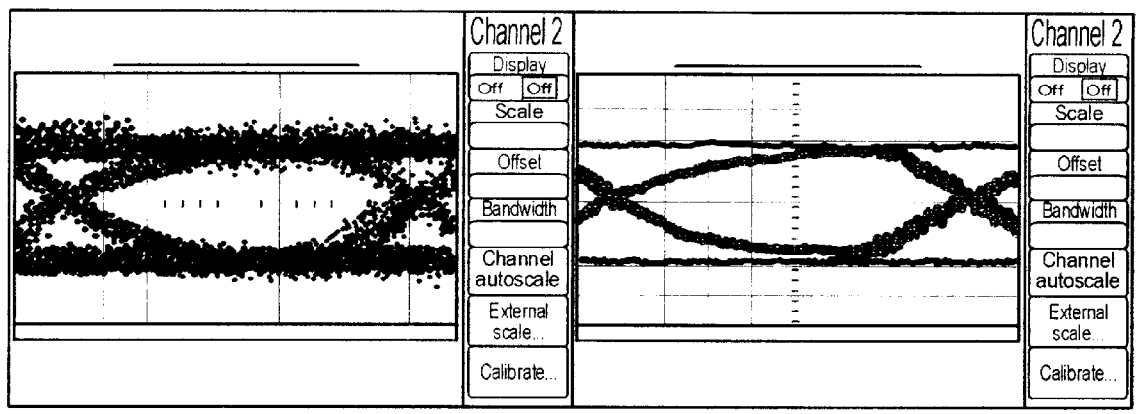
FIG. 5B is a diagram of the output of the receiver of an ultra-short-reach optical transceiver tested using the exemplary test configuration depicted in FIG. 5A.
Figure 5C:
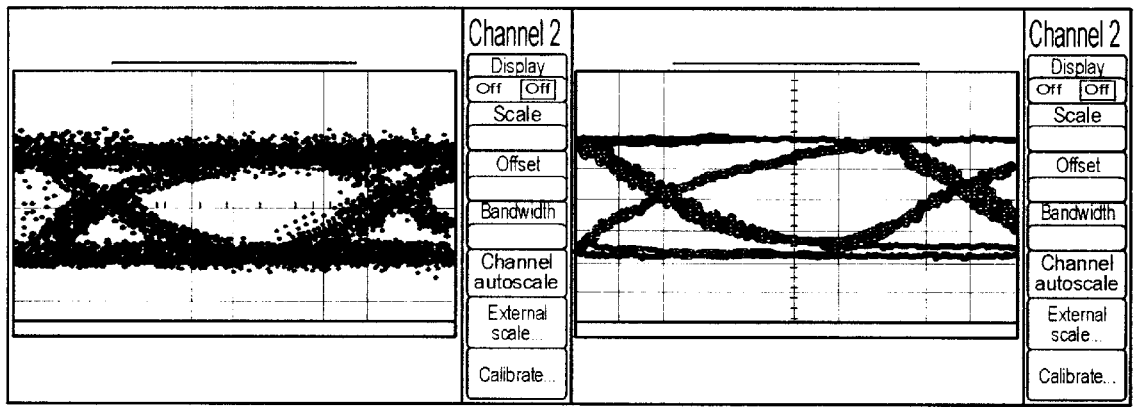
FIG. 5C is a diagram of the output of the receiver of an ultra-short-reach optical transceiver tested using the exemplary test configuration depicted in FIG. 5A.
Figure 5D:
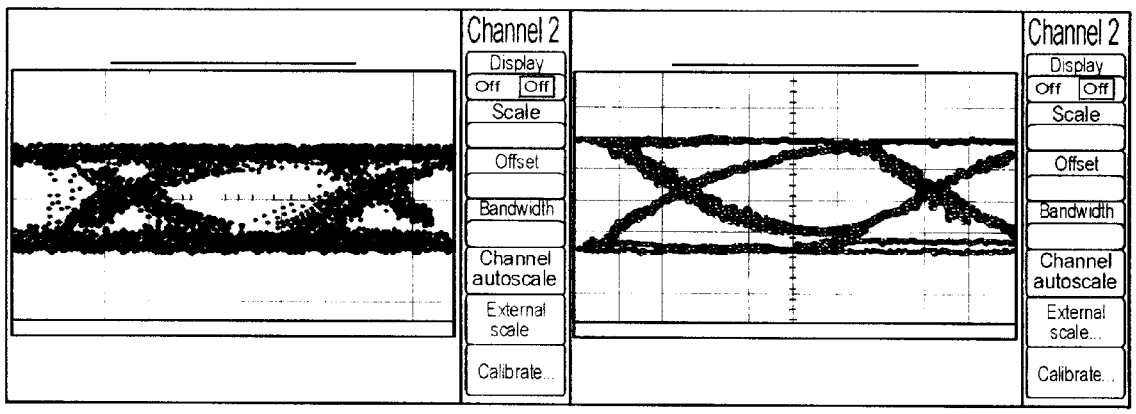
FIG. 5D is a diagram of the output of the receiver of an ultra-short-reach optical transceiver tested using the exemplary test configuration depicted in FIG. 5A.
Figure 5E:
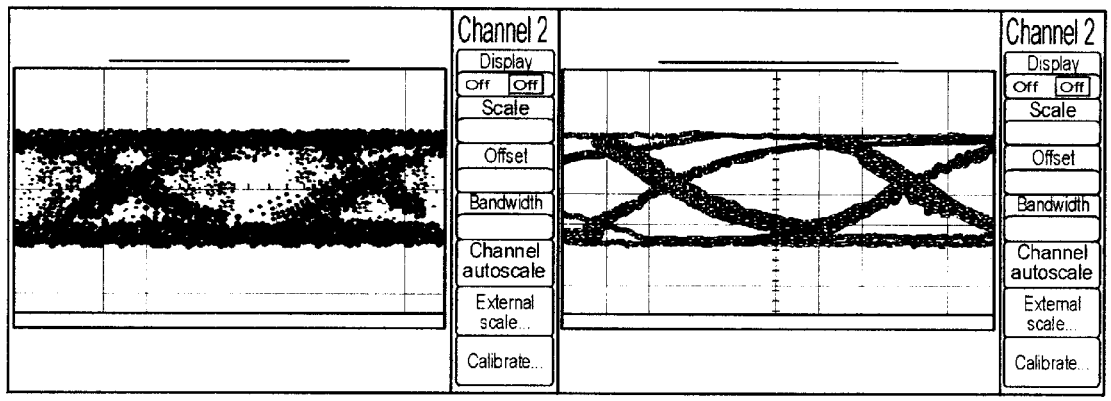
FIG. 5E is a diagram of the output of the receiver of an ultra-short-reach optical transceiver tested using the exemplary test configuration depicted in FIG. 5A.

FIG. 4A illustrates a test configuration 400 for analyzing the optical output waveform of the transmitter of a transceiver (e.g., optical transceiver 100) being tested, exemplified here by a transceiver 401 (the transmitter portion thereof being the portion of transceiver 401 under test). A bit error rate tester 402 is coupled to a test platform 403 via a cable 404. Preferably, cable 404 is a coaxial cable with an impedance of approximately 50 Ω. On test platform 403, cable 404 is coupled to a buffer 405, by a capacitor 407 and a resistor 408. Bit error rate tester 402 may be of any known design, and may include, for example, an HP-71604B generator and an HP-71603B analyzer, both from Hewlett-Packard of Palo Alto, Calif. Capacitor 407 is provided to allow coupling of AC signals and preferably has a capacitance of 0.1 µF, while resistor 408 is approximately 50 Ω and terminates the input line. Buffer 405 is powered by a voltage 409, which can be, for example, −5 VDC. Buffer 405 may be, for example, a device employing emitter-coupled logic (ECL) technology, such as an MC10EL16 from Motorola of Schaumberg, Ill. Buffer 405, in turn, drives the transmitter of the transceiver under test, exemplified here by a transceiver 401, using a differential driver internal to buffer 405. Voltages on the differential lines are stabilized by a set of resistors, resistors 411, 412, 413, and 414, between a voltage 415 (e.g., −3.3 VDC) and a ground 416, which acts as a 50 Ω Thevenin termination and provides bias control.

Transceiver 401 outputs an optical signal (not shown) on a fiber-optic cable 420. Preferably, fiber-optic cable 420 is at least about 50 m in length. More preferably, fiber-optic cable 420 is at least about 100 m in length, and most preferably, is up to about 500 m in length. The optical signal is converted back into an electrical signal by an optical-to-electrical (O-E) converter 430. O-E converter 430 may be of any known design, such as an HP-83446A lightwave clock and data receiver from Hewlett-Packard of Palo Alto, Calif. O-E converter 430 provides an electrical equivalent of the received optical signal to a signal display 440, which may be, for example, a digitizing oscilloscope. The optical output of transceiver 401 is displayed on signal display 440, allowing analysis of the signal with respect to signal power and eye opening at a bit rate of between about 2 Gbps and about 3 Gbps, and, more preferably, at a bit rate of about 2.488 Gbps.

Figure 4B:
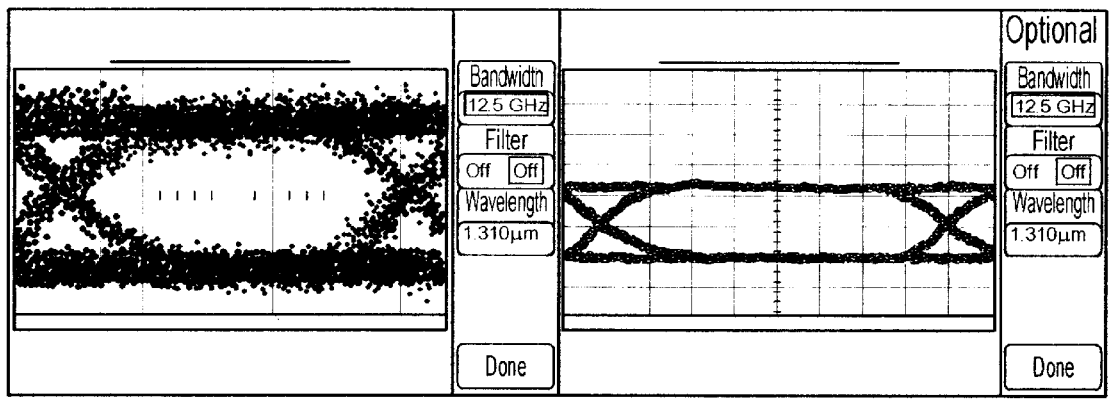
FIG. 4B is a diagram of the optical output of the transmitter of an ultra-short-reach optical transceiver tested using the exemplary test configuration depicted in FIG. 4A.
Figure 4C:
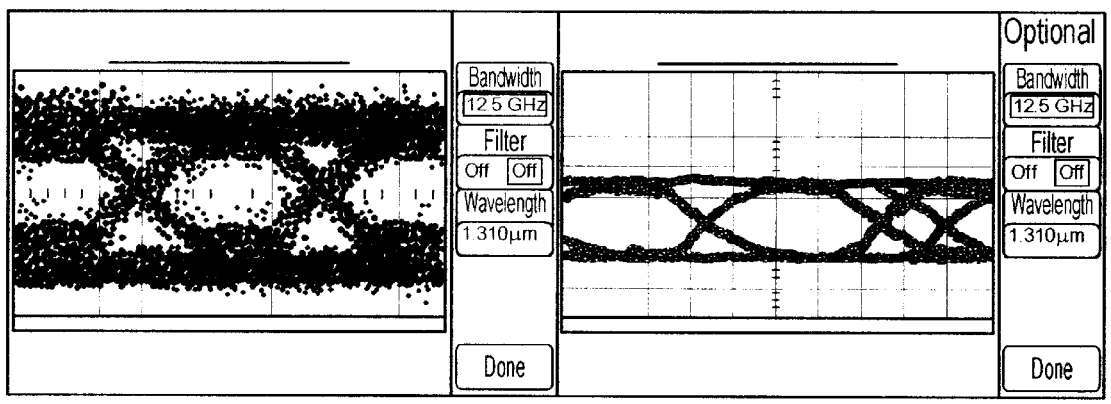
FIG. 4C is a diagram of the optical output of the transmitter of an ultra-short-reach optical transceiver tested using the exemplary test configuration depicted in FIG. 4A.

FIGS. 4B and 4C illustrate results observed using a test configuration such as test configuration 400. The optical output waveform of a test transceiver is shown for transmission speeds of about 1.2 Gbps (FIG. 4B) and about 2.4 Gbps (FIG. 4C). It will be noted that no filtering has been performed on the signal in FIG. 4B, while the signal in FIG. 4C has been filtered using a fourth-order Bessel-Thomson low-pass filter. These waveforms visually illustrate several signal quality metrics, including rise/fall times of their respective waveforms (in ps), the size of the eye opening (in ns), and over/undershoot of the waveform (as evidenced by data points outside the main waveform in each figure). Also noticeable are the effects of the low-pass filter through which the signal in FIG. 4C has been passed, which include a smoothing of the signal displayed.

FIG. 5A illustrates a test configuration 500 for analyzing the receiver section of a transceiver (e.g., optical transceiver 100) being tested, exemplified again by transceiver 401 (the receiver portion thereof being the portion of transceiver 401 under test). Thus, in FIG. 5A, however, transceiver 401 is configured to receive the optical signal. A bit error rate tester 502 is coupled to a test platform 503 via a cable 504. Preferably, cable 504 is a coaxial cable with an impedance of approximately 50 Ω. On test platform 503, cable 504 is coupled to a buffer 505 by a capacitor 507 and a resistor 508. Bit error rate tester 502 may be of any known design, and may include, for example, an HP-71604B generator and an HP-71603B analyzer, both from Hewlett-Packard of Palo Alto, Calif. Capacitor 507 is provided to allow coupling of AC signals and preferably has a capacitance of 0.1 µF, while resistor 508 is approximately 50 Ω and terminates the input line. Buffer 505 is powered by a voltage 509, which can be, for example, −5VDC. Buffer 505 may be, for example, a device employing emitter-coupled logic (ECL) technology, such as an MC10EL16 from Motorola of Schaumberg, Ill. Buffer 505, in turn, drives an optical transmitter 510, using a differential driver internal to buffer 505. Voltages on the differential lines are stabilized by a set of resistors, resistors 511, 512, 513, and 514, between a voltage 515 (e.g., −3.3 VDC) and a ground 516, which acts as a 50 Ω Thevenin termination and provides bias control. Preferably, test platform 503 is implemented using a reference transmitter, such as an HP-83424A from Hewlett-Packard of Palo Alto, Calif.

Transmitter 510 outputs an optical signal (not shown) on a fiber-optic cable 520. Preferably, fiber-optic cable 520 is at least about 50 m in length. More preferably, fiber-optic cable 520 is at least about 100 m in length, and most preferably, is up to about 500 m in length. The optical signal is received by the receiver of transceiver 401. Transceiver 401 provides an electrical signal representing the received optical signal to a CDR unit 530, which recovers the clocking information from the incoming data stream and in turn extracts the data therefrom. CDR unit 530 supplies the recovered data stream to a signal display 540, which may be, for example, a digitizing oscilloscope or other display device. For example, an HP-83480A can be employed in this capacity. The optical output of transceiver 401 recovered by CDR 530 is displayed on signal display 540, allowing analysis of the signal with respect to signal power, rise and fall times, eye opening, over/under-shoot, and other signal quality characteristics at a bit rate of between about 2 Gbps and about 3 Gbps, and, more preferably, at a bit rate of about 2.488 Gbps.

Figure 5F:
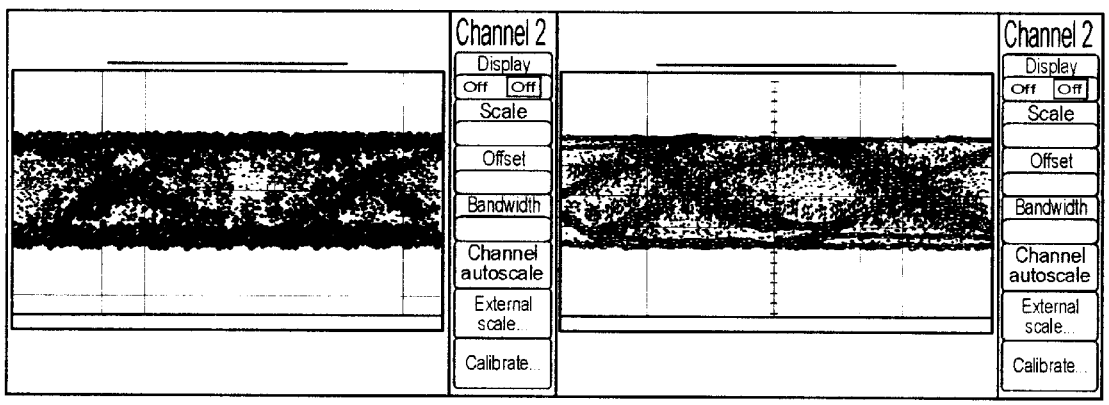
FIG. 5F is a diagram of the output of the receiver of an ultra-short-reach optical transceiver tested using the exemplary test configuration depicted in FIG. 5A.

FIGS. 5B–5F illustrate results observed using a test configuration such as test configuration 500. The output waveform of the receiver section of a test transceiver is shown for transmission speeds of about 1.244 Gbps (FIG. 5B), 1.544 Gbps (FIG. 5C), 1.844 Gbps (FIG. 5D), 2.144 Gbps (FIG. 5E), and about 2.444 Gbps (FIG. 5F). These waveforms visually illustrate several signal quality metrics, including rise/fall times of their respective waveforms (in ps), the size of the eye opening (in ns), and over/undershoot of the waveform (as evidenced by data points outside the main waveform in each figure).

Figure 6A:
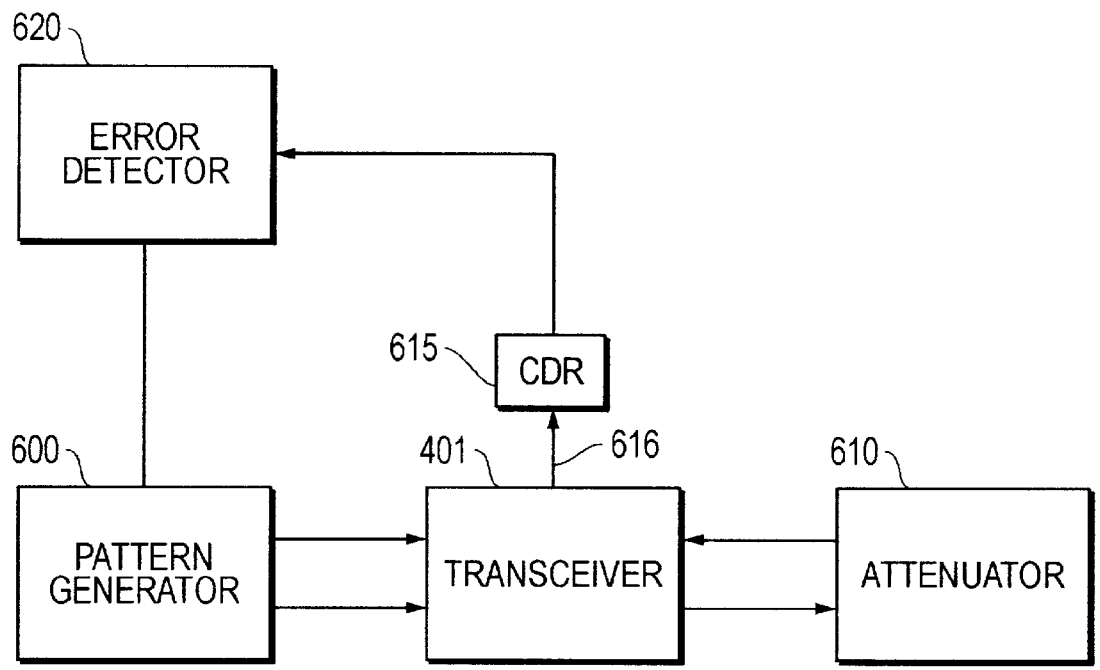
FIG. 6A is a block diagram of an exemplary test configuration for testing the sensitivity of an ultra-short-reach optical transceiver.

FIG. 6A illustrates another test configuration that may be used to test transceiver 401. In this configuration, a pattern generator 600 supplies bit patterns to transceiver 401 using a differential connection. Pattern generator 600 can be, for example, an HP-71604B from Hewlett-Packard of Palo Alto, Calif. Pattern generator 600 supplies this data at various bit rates to determine the sensitivity of transceiver 401 at various operating speeds. Transceiver 401 transmits the data from its transmitter, through an attenuator 610 (e.g., an HP-8156A from Hewlett-Packard of Palo Alto, Calif.), to its receiver. The received optical signal is then converted back into an electrical signal, which is then fed into a CDR unit 615 via a signal line 616, which supplies a recovered data stream to an error detector 620. It will be noted that the waveforms depicted in FIGS. 4B–4C and 5B–5F were sampled at various points along signal line 616. Error detector 620 may be of any conventional design, and can be, for example, an HP-71603 from Hewlett-Packard of Palo Alto, Calif. Error detector 620 is, in turn, coupled to pattern generator 600. Error detector 620 detects errors in the output of transceiver 401 by comparing the bit pattern received with that which was sent by pattern generator 600. An example of bit rate versus sensitivity for four sample transceivers tested using such an arrangement is given in Table 1.

TABLE 1

Bit rate versus sensitivity for sample transceivers.

| Bit Rate (Gbps) | Pattern | Sensitivity of sample 1 (dBm) | Sensitivity of sample 2 (dBm) | Sensitivity of sample 3 (dBm) | Sensitivity of sample 4 (dBm) | Power Supply (V) |
|---|---|---|---|---|---|---|
| 1.244 | $2^7$-1 | −26.1 ($1 \times 10^{-10}$) | −26.2 ($1 \times 10^{-10}$) | −27.3 ($1 \times 10^{-10}$) | −26.5 ($1.42 \times 10^{-4}$) | 3.3 |
| 1.544 | $2^7$-1 | −21.1 ($1 \times 10^{-10}$) | −24.0 ($1 \times 10^{-10}$) | −25.5 ($1 \times 10^{-10}$) | −25.3 ($1.65 \times 10^{-6}$) | 3.3 |
| 1.844 | $2^7$-1 | — | −18.8 ($1 \times 10^{-10}$) | −22.6 ($1 \times 10^{-10}$) | −24.5 ($2.31 \times 10^{-8}$) | 3.3 |
| 2.144 | $2^7$-1 | — | — | −19.6 ($1 \times 10^{-10}$) | −23.7 ($7.11 \times 10^{-11}$) | 3.3 |
| 2.444 | $2^7$-1 | — | — | — | −18.8 ($3.36 \times 10^{-12}$) | 3.3 |

Figure 6B:
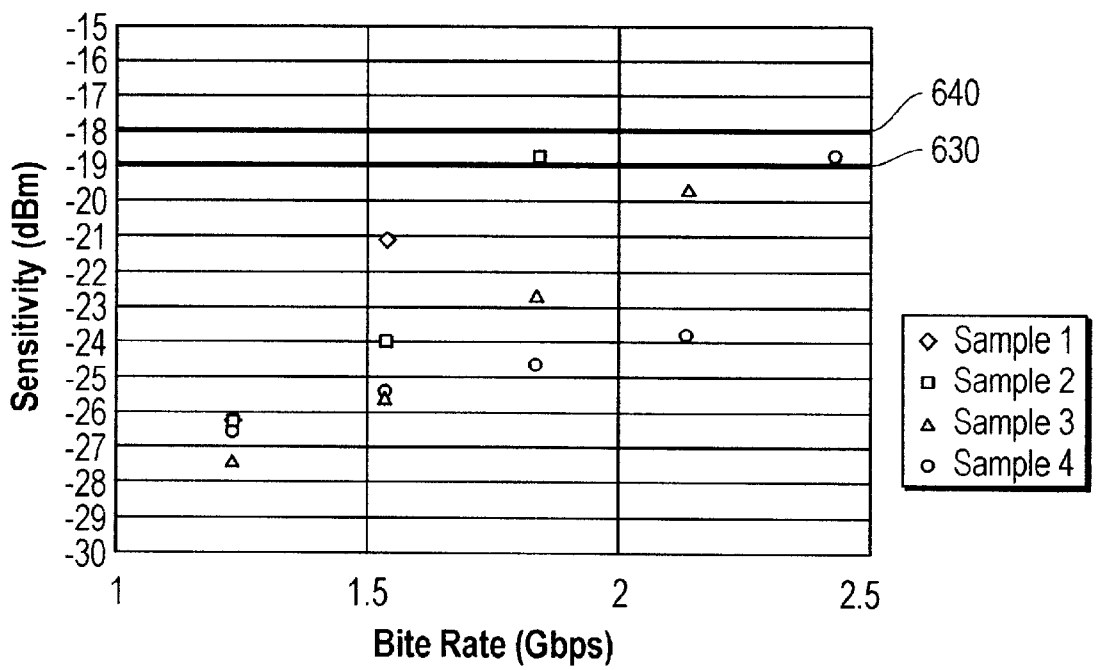
FIG. 6B is a diagram of sensitivity versus bit rate for an ultra-short-reach optical transceiver tested using the exemplary test configuration depicted in FIG. 6A.

A $2^7$-1 pseudo-random bit pattern and a power supply voltage of 3.3 V were used for each of the measurements. The bit error rate (BER) for each sensitivity measurement is given below the respective sensitivity measurement. Depicted graphically in FIG. 6B is the relationship between bit rate and sensitivity (receiver sensitivity, or $P_{Rmin}$, as defined at p. 4–12, section 4.2.5, in Bellcore GR-253 [GR-253: *Synchronous Optical Network (SONET) Transport Systems*, Common Generic Criteria, Issue 2 [Bellcore, December 1995], included herein by reference, in its entirety and for all purposes)]). In FIG. 6B, diamonds represent sample 1, squares represent sample 2, triangles represent sample 3, and circles represent sample 4. As can be seen in both Table 1 and the graph of FIG. 6B, relatively higher bit rates require greater sensitivity of transceiver 401 for acceptable operation (i.e., acceptably low BER). However, most of the measurements in this example are at or below sensitivity limits set in both GR-253 (−19 dBm) (exemplified by limit line 630) and all are below the $P_{Rmin}$ specified for the part itself (here, −18 dBm) (exemplified by limit line 640). It will also be noted that for sample 4, given the lower BERs observed at higher bit rates, the effective sensitivity for sample 4 at a BER of $1 \times 10^{-10}$ would be expected to be within the aforementioned limits.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention.

Moreover, while the invention has been particularly shown and described with reference to these specific embodiments, it will be understood by those skilled in the art that the foregoing and other changes in the form and details may be made therein without departing from the spirit or scope of the invention. For example, the present invention should not be limited to only a transceiver arrangement. The transmitter and receiver described herein might, for example, be implemented using discrete components or as separate units. Consequently, the scope of the invention should be determined with reference to the appended claims.

What is claimed is:

1. An ultra-short-reach optical transceiver comprising:

an optical transmitter configured to transmit a first signal, wherein said optical transmitter is nominally designed to transmit data at a designed transmit bit rate of between about 0.9 Gbps and about 1.25 Gbps, said first signal has a bit rate of between about 2 Gbps and about 3 Gbps, and said first signal exhibits an eye opening of at least about 50%;

an optical receiver configured to receive a second signal, wherein said optical receiver is nominally designed to receive data at a designed receive bit rate of between about 0.9 Gbps and about 1.25 Gbps, and said second signal has a bit rate of between about 2 Gbps and about 3 Gbps; and a clock and data recovery unit, coupled to said optical receiver, wherein said ultra-short-reach optical transceiver is configured to exchange data with another such ultra-short-reach optical transceiver over a fiber-optic cable of up to about 500 m in length.

2. The ultra-short-reach optical transceiver of claim 1, wherein said ultra-short-reach optical transceiver is configured to operate at temperatures of between about −5° C. and about 85° C.

3. The ultra-short-reach optical transceiver of claim 1, wherein said ultra-short-reach optical transceiver is configured to operate at temperatures of between about 0° C. and about 70° C.

4. The ultra-short-reach optical transceiver of claim 1, wherein said first signal exhibits an eye opening of at least about 70%.

5. The ultra-short-reach optical transmitter of claim 1, wherein said bit rate of said first signal is about 2.488 Gbps.

6. The ultra-short-reach optical receiver of claim 1, wherein said bit rate of said second signal is about 2.488 Gbps.

7. The ultra-short-reach optical transceiver of claim 1, wherein said clock and data recovery unit is designed to operate at a third bit rate of about 2.488 Gbps.

8. The ultra-short-reach optical transceiver of claim 1, wherein said fiber-optic cable is at least about 50 m in length.

9. An ultra-short-reach optical communications system comprising:
- a fiber-optic cable, said fiber-optic cable being up to about 500 m in length;
- a first one of the ultra-short-reach optical transceiver of claim 1, coupled to said fiber-optic cable; and
- a second one of the ultra-short-reach optical transceiver of claim 1, coupled to said fiber-optic cable.

10. The ultra-short-reach optical transceiver of claim 9, wherein said fiber-optic cable is at least about 50 m in length.

11. The ultra-short-reach optical transceiver of claim 9, wherein said ultra-short-reach optical communications system transfers data between said first and said second ultra-short-reach optical transceivers at a bit rate of between about 2 Gbps and about 3 Gbps.

12. The ultra-short-reach optical transceiver of claim 11, wherein said ultra-short-reach optical communications system transfers data between said first and said second ultra-short-reach optical transceivers at a bit rate of about 2.488 Gbps.

13. An ultra-short-reach optical transmitter comprising:
- a laser diode driver; and
- a laser diode, wherein
  - said ultra-short-reach optical transmitter is nominally designed to transmit data at a designed transmit bit rate of between about 0.9 Gbps and about 1.25 Gbps,
  - said ultra-short-reach optical transmitter is configured to transmit a first signal,
  - said first signal has a bit rate of between about 2 Gbps and about 3 Gbps,
  - said first signal exhibits an eye opening of at least about 50%, and
  - said ultra-short-reach optical transmitter is configured to transmit data to an ultra-short-reach optical receiver over a fiber-optic cable of up to about 500 m in length.

14. The ultra-short-reach optical transmitter of claim 13, wherein said first signal exhibits an eye opening of at least about 70%.

15. The ultra-short-reach optical transmitter of claim 13, wherein said bit rate of said first signal is about 2.488 Gbps.

16. The ultra-short-reach optical transceiver of claim 13, wherein said designed transmit bit rate is about 1 Gbps.

17. The ultra-short-reach optical transceiver of claim 13, wherein said fiber-optic cable is at least about 50 m in length.

* * * * *